US011898338B2

(12) United States Patent
Turner et al.

(10) Patent No.: US 11,898,338 B2
(45) Date of Patent: Feb. 13, 2024

(54) DRAIN CLEANING DEVICE

(71) Applicants: Stephen S. Turner, Edelstein, IL (US); Scott I. Turner, Chillicothe, IL (US)

(72) Inventors: Stephen S. Turner, Edelstein, IL (US); Scott I. Turner, Chillicothe, IL (US)

( * ) Notice: Subject to any disclaimer, the term of this patent is extended or adjusted under 35 U.S.C. 154(b) by 253 days.

(21) Appl. No.: 17/113,678

(22) Filed: Dec. 7, 2020

(65) Prior Publication Data

US 2021/0087802 A1 Mar. 25, 2021

Related U.S. Application Data

(63) Continuation of application No. PCT/US2020/031954, filed on May 7, 2020, and a continuation-in-part of application No. 16/580,635, filed on Sep. 24, 2019, now Pat. No. 10,857,577, said application No. PCT/US2020/031954 is a continuation-in-part of application No. 16/580,635, filed on Sep. 24, 2019, now Pat. No. 10,857,577.

(60) Provisional application No. 62/844,458, filed on May 7, 2019.

(51) Int. Cl.
*E03C 1/302* (2006.01)
*B08B 9/045* (2006.01)

(52) U.S. Cl.
CPC .............. *E03C 1/302* (2013.01); *B08B 9/045* (2013.01)

(58) Field of Classification Search
CPC .................................. B08B 9/04; E03C 1/302
USPC ...................................................... 15/104.05
See application file for complete search history.

(56) References Cited

U.S. PATENT DOCUMENTS

| | | | | |
|---|---|---|---|---|
| 566,110 A * | 8/1896 | Wrigley | E03F 9/005 15/104.33 |
| 984,473 A * | 2/1911 | Cornelius | E03F 9/005 15/104.33 |
| 1,051,992 A | 2/1913 | Fisher et al. | |
| 1,588,737 A | 6/1926 | Hurd | |
| 1,783,256 A * | 12/1930 | Miller | E03C 1/302 81/487 |

(Continued)

FOREIGN PATENT DOCUMENTS

| | | | |
|---|---|---|---|
| CA | 2919494 A1 * | 7/2016 | B08B 9/027 |
| CA | 2956555 A1 * | 7/2017 | B08B 9/027 |

(Continued)

OTHER PUBLICATIONS

PCT Form 210, International Search Report for PCT/US2020/031954, dated Jun. 10, 2020.

(Continued)

*Primary Examiner* — Marc Carlson

(74) *Attorney, Agent, or Firm* — The Law Office of Patrick F. O'Reilly III, LLC

(57) ABSTRACT

A drain cleaning device for removing debris from a drain is disclosed herein. In one embodiment, the drain cleaning device includes a handle section, an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements integrally formed with the central core portion, the plurality of protruding elements configured to grab and collect debris from the drain pipe.

19 Claims, 13 Drawing Sheets

(56) References Cited

U.S. PATENT DOCUMENTS

| | | | | | |
|---|---|---|---|---|---|
| 2,717,437 | A | | 9/1955 | De Mestral | |
| 4,123,894 | A | | 11/1978 | Hughes et al. | |
| 4,174,548 | A | * | 11/1979 | Dunn | E03F 9/005 4/255.11 |
| 5,231,738 | A | * | 8/1993 | Higashinaka | A44B 18/0088 24/448 |
| 5,423,621 | A | * | 6/1995 | Russell | E03C 1/308 401/15 |
| 5,669,120 | A | * | 9/1997 | Wessels | A44B 18/0088 24/445 |
| 5,769,960 | A | * | 6/1998 | Nirmel | E03C 1/302 15/104.31 |
| 5,836,032 | A | * | 11/1998 | Hondo | E03C 1/30 15/104.001 |
| 6,131,229 | A | * | 10/2000 | Lincuna | B08B 9/0436 15/104.31 |
| 6,161,371 | A | | 12/2000 | Glesser | |
| 6,775,873 | B2 | * | 8/2004 | Luoma | E03C 1/302 15/104.001 |
| RE38,652 | E | * | 11/2004 | Provost | A44B 18/0061 24/442 |
| 6,827,794 | B2 | | 12/2004 | Sommerfeld, Sr. | |
| 6,898,807 | B2 | * | 5/2005 | Tash | E03C 1/308 4/255.11 |
| 7,584,513 | B2 | | 9/2009 | Turner | |
| 7,810,176 | B2 | | 10/2010 | Turner | |
| 8,359,696 | B1 | * | 1/2013 | Turner | B08B 9/045 15/104.03 |
| 8,745,771 | B2 | * | 6/2014 | Bates | E03C 1/304 4/255.04 |
| 9,670,656 | B2 | * | 6/2017 | Rutkowski | F16D 1/112 |
| 9,945,108 | B1 | * | 4/2018 | Turner | B08B 9/045 |
| 10,047,508 | B2 | * | 8/2018 | Elliott | E03C 1/302 |
| 10,072,405 | B2 | * | 9/2018 | Beck | E03C 1/302 |
| 10,683,648 | B2 | * | 6/2020 | Beck | B25G 3/34 |
| 10,857,577 | B2 | * | 12/2020 | Turner | B08B 9/04 |
| 2006/0021123 | A1 | | 2/2006 | Turner | |
| 2006/0195994 | A1 | * | 9/2006 | Hung | B08B 9/045 15/104.095 |
| 2012/0005849 | A1 | * | 1/2012 | Tash | E03C 1/302 15/104.33 |
| 2013/0000680 | A1 | * | 1/2013 | Azelton | E03C 1/302 134/166 C |
| 2014/0325747 | A1 | * | 11/2014 | Gwen | E03C 1/302 4/255.01 |
| 2015/0113748 | A1 | | 4/2015 | Rutkowski | |
| 2016/0221050 | A1 | * | 8/2016 | Beck | E03C 1/302 |
| 2017/0130443 | A1 | * | 5/2017 | Mills | E03C 1/302 |
| 2017/0342693 | A1 | * | 11/2017 | Tisch | E03C 1/302 |
| 2018/0066420 | A1 | * | 3/2018 | Beck | B25G 1/102 |
| 2021/0086240 | A1 | * | 3/2021 | Turner | E03C 1/302 |

FOREIGN PATENT DOCUMENTS

| | | | | | |
|---|---|---|---|---|---|
| CN | 2490219 | Y | | 5/2002 | |
| FR | 3009007 | A1 | * | 1/2015 | E03C 1/302 |
| FR | 3009007 | A1 | | 1/2015 | |
| WO | 2013048088 | A1 | | 4/2013 | |
| WO | WO-2013048088 | A1 | * | 4/2013 | A47L 25/00 |

OTHER PUBLICATIONS

PCT Form 237, Written Opinion of the International Searching Authority for PCT/US2020/031954, dated Jun. 10, 2020.
First ofiice action on the merits from the China National Intellectual Property Administration for Chinese Patent Appl. No. 202080049727.2, dated Feb. 8, 2023.
Second office action on the merits from the China National Intellectual Property Administration for Chinese Patent Appl. No. 202080049727.2, dated Nov. 2, 2023.

* cited by examiner

Section A-A

FIG. 6
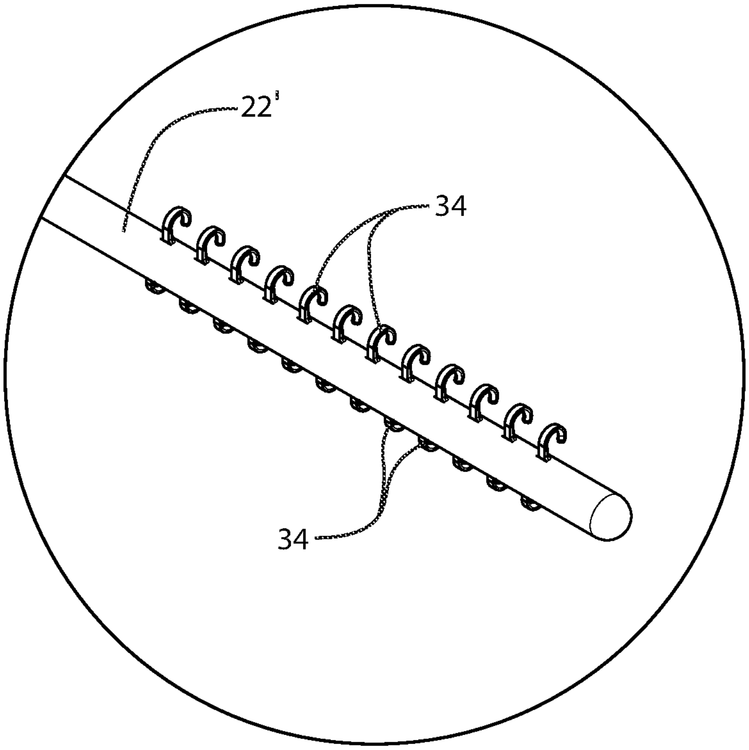
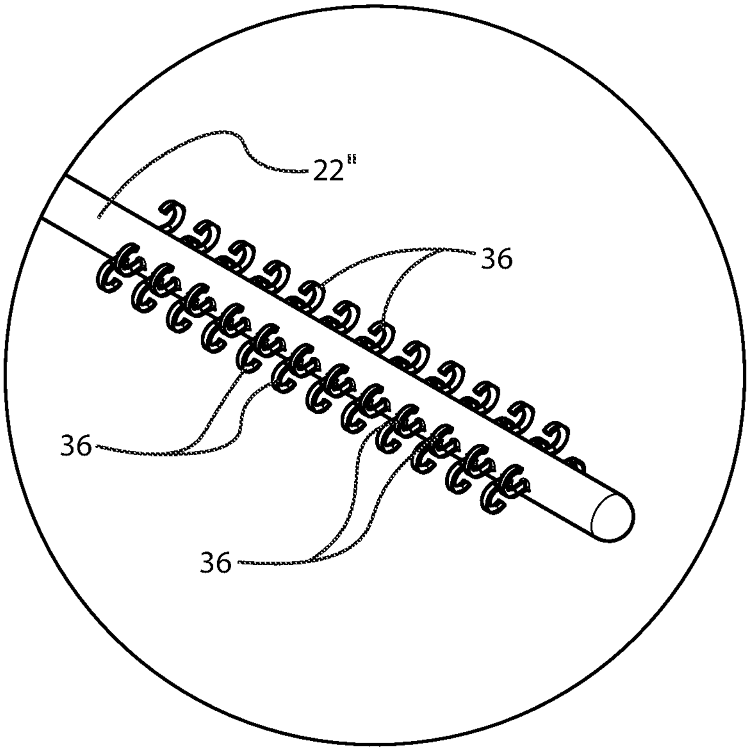
FIG. 7

Section B-B

Detail “A”

Section C-C

DRAIN CLEANING DEVICE

CROSS-REFERENCE TO RELATED APPLICATIONS

This patent application is a continuation-in-part of U.S. Nonprovisional patent application Ser. No. 16/580,635, entitled “Drain Cleaning Device”, filed on Sep. 24, 2019, which claims the benefit of U.S. Provisional Patent Application No. 62/844,458, entitled “Drain Cleaning Device”, filed on May 7, 2019, all of the disclosures of which are herein expressly incorporated by reference in their entireties.

The patent application also is a continuation of International Application No. PCT/US2020/031954, entitled “Drain Cleaning Device”, filed on May 7, 2020, which claims priority to U.S. Nonprovisional patent application Ser. No. 16/580,635, entitled “Drain Cleaning Device”, filed on Sep. 24, 2019, which claims the benefit of U.S. Provisional Patent Application No. 62/844,458, entitled “Drain Cleaning Device”, filed on May 7, 2019, all of the disclosures of which are herein expressly incorporated by reference in their entireties.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a drain cleaning device. More particularly, the invention relates to a drain cleaning device used for cleaning drains by removing hair and other debris that is collected in the upper portion of the drain where stopper or strainer mechanisms and other obstructions occur or collected anywhere along the drain pipe down to the bottom elbow bends of the drain where hair and other debris has collected (e.g., in the drain trap).

2. Background

Bathroom drains are clogged most often by hair that enters the drain and collects from the drain trap at the bottom up to the drain opening. Most frequently, the hair combines with sticky products such as soap, shampoo, and toothpaste and builds a “log-jam” of sorts where these drain obstructions catch the hair, and some settles in the drain trap. After sufficient amounts of hair have collected in the drain trap or around the upper opening, the water from the sink basin begins to drain noticeably more slowly, and eventually can completely block the water from draining. Drain chemicals, home remedies such as baking soda and vinegar and plungers are frequently used for these clogs, but often fail to dissolve or dislodge the hair clogging the drain. In extreme cases, the only remaining remedy is to disassemble the drain or use a device that can effectively reach, snag, and extract the hair (e.g., a drain snake).

Also, liquid or gel-based chemical drain unclogging agents can contain corrosive chemicals that may damage the drain structure. The drain cleaning chemicals may also cause health problems to those who handle the liquids or gels incorrectly. Another problem with chemical agents is that a significant portion of the chemical agent may flow past the hair-clog (for example, in the vertical portion of a bathroom sink drain) such that the chemical cannot effectively submerge the hair in order to completely dissolve it.

Therefore, what is needed is needed is a drain cleaning device for cleaning a bathroom drain or other type of drain that is capable of unblocking the drain of accumulated hair and other debris.

BRIEF SUMMARY OF EMBODIMENTS OF THE INVENTION

Accordingly, the present invention is directed to a drain cleaning device that substantially obviates one or more problems resulting from the limitations and deficiencies of the related art.

In accordance with one or more embodiments of the present invention, there is provided a drain cleaning device for removing debris from a drain. The drain cleaning device comprises a handle section, the handle section including an upper handle portion and a lower handle portion, the upper handle portion being spaced apart from the lower handle portion along a length of the drain cleaning device, the upper handle portion configured to accommodate a first hand of a user during a spinning of the drain cleaning device by the user, and the lower handle portion configured to accommodate a second hand of the user during the spinning of the drain cleaning device by the user; an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements extending from the central core portion, the plurality of protruding elements configured to grab and collect debris from the drain pipe.

In a further embodiment of the present invention, the handle section further comprises a diagonal handle portion connecting the upper handle portion to the lower handle portion, the diagonal handle portion having a recess formed therein that extends between the upper handle portion and the lower handle portion, and the recess of the diagonal handle portion having a flat bottom wall.

In yet a further embodiment, at least one section of the upper handle portion has a generally circular cross-section.

In still a further embodiment, the lower handle portion further comprises a sleeve member rotatably disposed about a central core section of the lower handle portion, the sleeve member configured to be grasped by the second hand of the user during the spinning of the drain cleaning device by the user such that a remainder of the drain cleaning device is able to be rotated relative to the sleeve member while the sleeve member is held stationary by the second hand of the user.

In yet a further embodiment, the elongated rod section does not contain any ribs or protruding elements between the first and second ends of the elongated rod section.

In still a further embodiment, at least a portion of the elongated rod section has a generally circular cross-section.

In yet a further embodiment, at least one of the upper handle portion and the lower handle portion comprises an hourglass-shaped portion for facilitating the spinning of the drain cleaning device by the user.

In still a further embodiment, the at least one hourglass-shaped portion of the handle section comprises an upper hourglass-shaped portion on the upper handle portion and a lower hourglass-shaped portion on the lower handle portion, the upper hourglass-shaped portion configured to accommodate the first hand of the user during the spinning of the drain cleaning device by the user, and the lower hourglass-shaped portion configured to accommodate the second hand of the user during the spinning of the drain cleaning device by the user.

In yet a further embodiment, the handle section further comprises a diagonal handle portion connecting the upper hourglass-shaped portion to the lower hourglass-shaped portion, the diagonal handle portion comprising one or more finger recesses for accommodating one or more fingers of the user when the drain cleaning device is being inserted into, and removed from the drain pipe.

In still a further embodiment, the tip section further comprises an outer covering formed from a hook material strip that is bonded to the central core portion of the tip section that extends from the elongated rod section, the hook material strip comprising the plurality of protruding elements of the tip section.

In yet a further embodiment, the central core portion of the tip section further comprises a mushroom-shaped cap disposed on a distal end thereof, the mushroom-shaped cap configured to prevent the hook material strip from being pulled off the central core portion of the tip section when the drain cleaning device is being removed from the drain pipe by the user.

In still a further embodiment, the plurality of protruding elements are in the form of a plurality of injection-molded micro-hook elements.

In yet a further embodiment, at least some of the plurality of injection-molded micro-hook elements are in the form of inverted J-shaped projections protruding outwardly from the central core portion of the tip section of the drain cleaning device.

In still a further embodiment, at least some of the plurality of injection-molded micro-hook elements are in the form of T-shaped projections protruding outwardly from the central core portion of the tip section of the drain cleaning device.

In accordance with one or more other embodiments of the present invention, there is provided a drain cleaning device for removing debris from a drain. The drain cleaning device comprises a handle section; an elongated rod section having a first end and a second end oppositely disposed relative to the first end, the first end of the elongated rod section being connected to the handle section, the elongated rod section not containing any ribs or protruding elements between the first and second ends of the elongated rod section; and a tip section connected to the second end of the elongated rod section, the tip section including a central core portion and a plurality of protruding elements integrally formed with the central core portion, the plurality of protruding elements configured to grab and collect debris from the drain pipe.

In a further embodiment of the present invention, the plurality of protruding elements are in the form of a plurality of injection-molded micro-hook elements.

In yet a further embodiment, at least one of the plurality of injection-molded micro-hook elements has a thickness between approximately 0.25 millimeters and approximately 0.50 millimeters; and the at least one of the plurality of injection-molded micro-hook elements has a height between approximately 1.5 millimeters and approximately 2.0 millimeters.

In still a further embodiment, the central core portion of the tip section has a circular cross-section, the plurality of injection-molded micro-hook elements are arranged in circumferentially spaced-apart rows on the circular central core portion, and each of the circumferentially spaced-apart rows comprises a subset of the injection-molded micro-hook elements arranged in a generally linear pattern.

In yet a further embodiment, at least a first subset of the plurality of injection-molded micro-hook elements are in the form of inverted J-shaped projections protruding outwardly from the central core portion of the tip section of the drain cleaning device; and at least a second subset of the plurality of injection-molded micro-hook elements are in the form of T-shaped projections protruding outwardly from the central core portion of the tip section of the drain cleaning device.

In accordance with yet one or more other embodiments of the present invention, there is provided a drain cleaning device for removing debris from a drain. The drain cleaning device comprises a handle section, the handle section including an upper handle portion, a lower handle portion, and a diagonal handle portion, the upper handle portion being spaced apart from the lower handle portion along a length of the drain cleaning device, the diagonal handle portion connecting the upper handle portion to the lower handle portion, the upper handle portion configured to accommodate a first hand of a user during a spinning of the drain cleaning device by the user, and the lower handle portion configured to accommodate a second hand of the user during the spinning of the drain cleaning device by the user; an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements integrally formed with the central core portion, the plurality of protruding elements configured to grab and collect debris from the drain pipe.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 6 is a perspective view illustrating a first alternative type of tip section that may be incorporated in the drain cleaning device;

FIG. 7 is a perspective view illustrating a second alternative type of tip section that may be incorporated in the drain cleaning device;

Throughout the figures, the same parts are always denoted using the same reference characters so that, as a general rule, they will only be described once.

DETAILED DESCRIPTION OF EMBODIMENTS OF THE INVENTION

Figure 1:
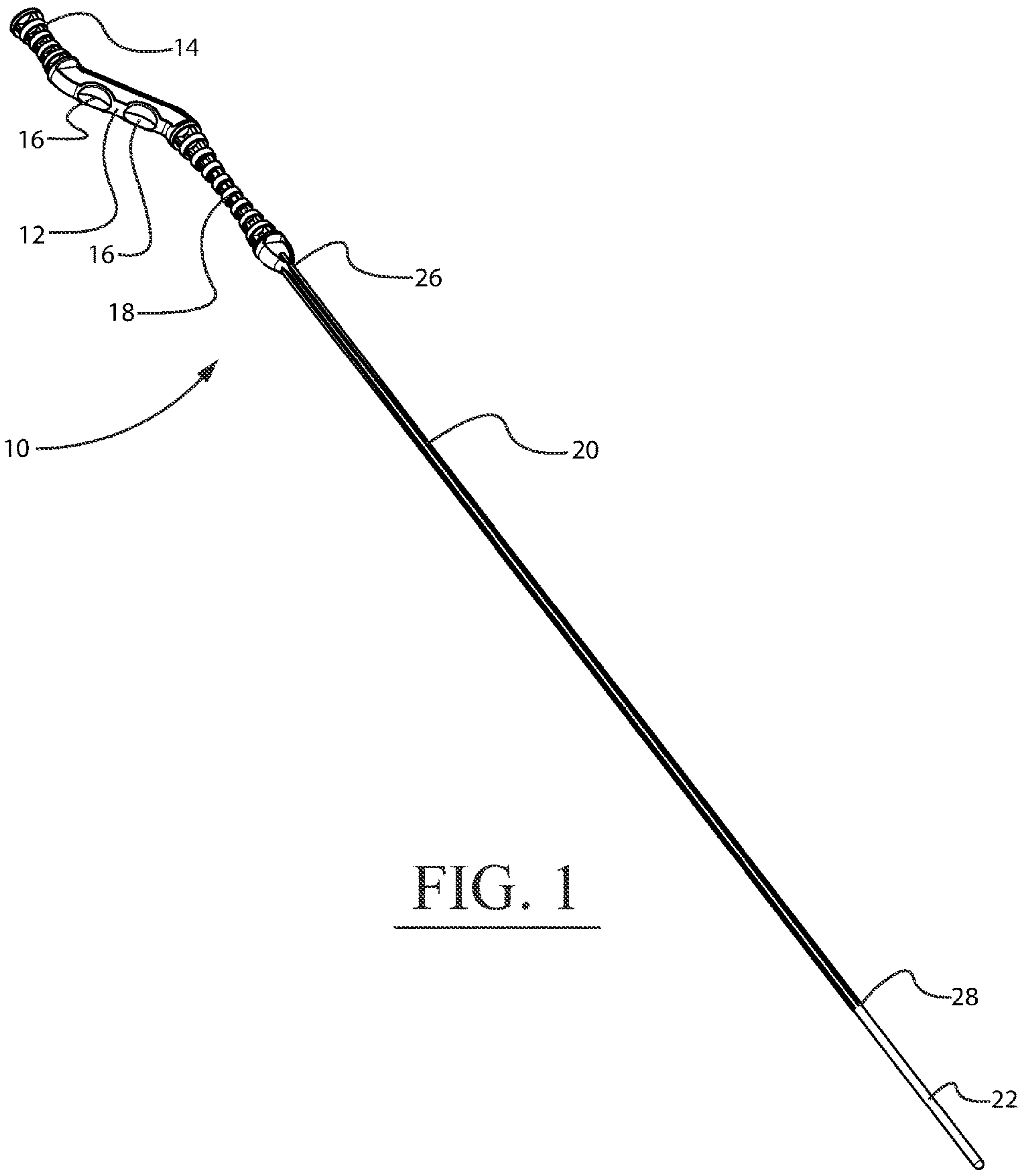
FIG. 1 is a perspective view of a drain cleaning device, according to a first embodiment of the invention.
Figure 2:
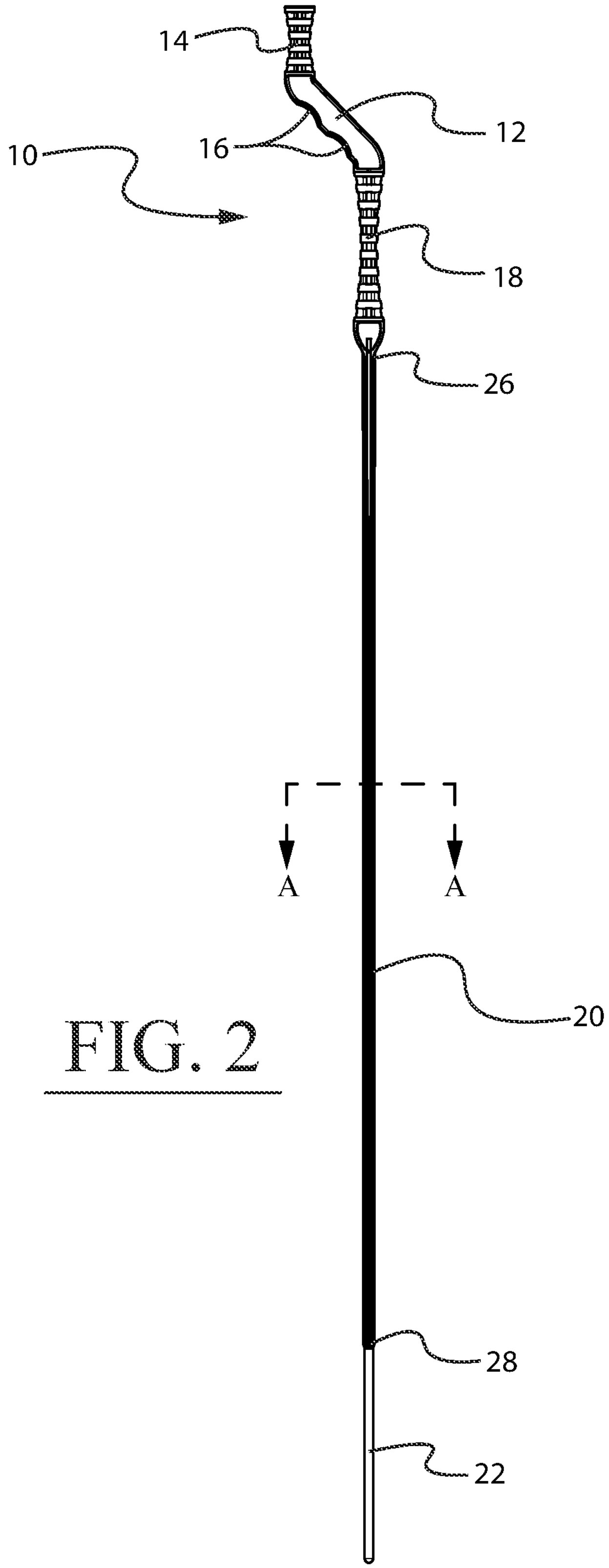
FIG. 2 is a front elevational view of the drain cleaning device of FIG. 1.

An illustrative embodiment of a drain cleaning device is seen generally at 10 in FIGS. 1-2. The drain cleaning device 10 is used for removing debris from a drain (e.g., from the drain pipe 48 of the drain 46 depicted in FIG. 8). With initial reference to FIGS. 1 and 2, it can be seen that the drain cleaning device 10 generally comprises a handle section 12, the handle section 12 including at least one hourglass-shaped portion 14, 18 for facilitating the spinning of the drain cleaning device 10 by a user; an elongated rod section 20 connected to the handle section 12, the elongated rod section 20 including one or more longitudinally extending ribs 24 disposed along a length thereof, the one or more longitudinally extending ribs 24 configured to add structural rigidity to the elongated rod section 20, and the one or more longitudinally extending ribs 24 further configured to facilitate the cleaning of grime from a side of a drain pipe 48 (see FIG. 8); and a tip section 22 connected to the elongated rod section 20, the tip section 22 including a plurality of hook elements 32 disposed thereon (see FIG. 5), the plurality of hook elements 32 configured to grab and collect debris from the drain pipe 48.

In the illustrative embodiment, with combined reference to FIGS. 1 and 2, it can be seen that the at least one hourglass-shaped portion 14, 18 of the handle section 12 comprises an upper hourglass-shaped portion 14 and a lower hourglass-shaped portion 18. The upper hourglass-shaped portion 14 is configured to accommodate a first hand 38 of a user during the spinning of the drain cleaning device 10 by the user (see FIG. 8). The lower hourglass-shaped portion 18 is configured to accommodate a second hand 40 of the user during the spinning of the drain cleaning device 10 by the user. In the illustrative embodiment, the handle section 12 further comprises a diagonal handle portion connecting the upper hourglass-shaped portion 14 to the lower hourglass-shaped portion 18. As shown in the illustrative embodiment of FIGS. 1 and 2, the diagonal handle portion comprises a pair of finger concave recesses or indentations 16 for accommodating fingers of the user when the drain cleaning device 10 is being inserted into, and removed from the drain pipe 48 (see FIG. 8).

Advantageously, the hourglass-shaped portions 14, 18 on the handle section 12 allow a user to spin the device 10 comfortably. In the illustrative embodiment, one hand 38 is placed on the upper hourglass-shaped portion 14, and the other hand 40 on the lower hourglass-shaped portion 18 to spin the device 10. Spinning action is important to dislodging hair clogs that accumulate in the drain (and get wrapped around drain parts, like the stopper). The finger recesses 16 are used for pushing and pulling the device 10 up and down within the drain. The up and down movement is used for pushing the device 10 further into the drain, or pulling the clog up and out of the drain.

Figure 4:
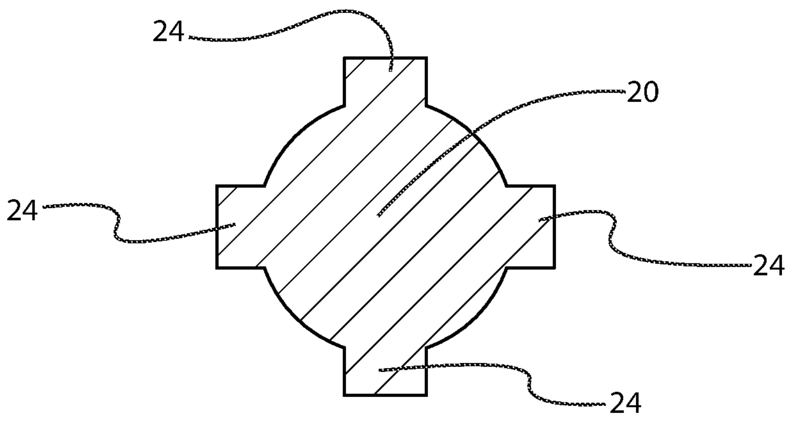
FIG. 4 is a transverse sectional view cut through the elongated rod section of the drain cleaning device of FIG. 1, wherein the section is generally cut along the cutting-plane line A-A in FIG. 2.

In the illustrative embodiment, as shown in FIGS. 1, 2, and 4, the one or more longitudinally extending ribs 24 of the elongated rod section 20 comprise a plurality of longitudinally extending ribs 24 that are circumferentially spaced apart from one another about a periphery of the elongated rod section 20 (e.g., four (4) ribs 24 spaced ninety degrees apart from one another about the circumference of the elongated rod section 20). The plurality of longitudinally extending ribs 24 are configured to add structural rigidity to the elongated rod section 20. Also, the plurality of longitudinally extending ribs 24 further are configured to facilitate the cleaning of grime from the side of the drain pipe 48 (see FIG. 8).

In the illustrative embodiment, the ribs 24 extend horizontally down the elongated rod section 20. The ribs 24 are tapered starting at the first end 26 of the elongated rod section 20 (e.g., starting at an approximately 3⁄16" diameter) and and taper down to a smaller diameter at the second end 28 of the elongated rod section 20 (e.g., ending at an approximately 1⁄8" diameter). The ribs 24 add rigidity to the elongated rod section 20 of the device 10. Without the ribs 24, the small diameter portion of the device 10 would be flimsy, and would not have the required stiffness to manipulate the drain. When the device 10 is spinned by a user, the ribs 24 can also act as a brush that clears grime from the sides of the drain pipe. At the end of the ribs 24 is yet another tapered area. This distal tapered area is important for helping the device 10 manuever over pipe joints. This tapered area also acts as a ledge so that the edge of the hook material strip 30 (e.g., made from the hook portion of Velcro®) does not get caught on drain parts when pulling the device 10 up and out of the drain.

Figure 5:
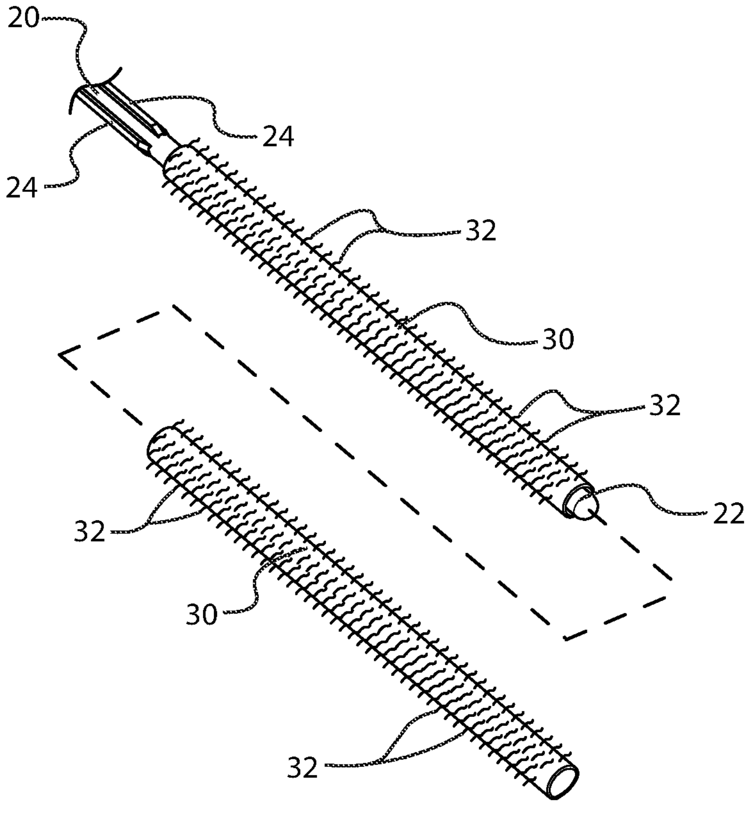
FIG. 5 is a perspective view illustrating the manner in which a hook material strip is inserted on the tip section of the drain cleaning device of FIG. 1.

Now, referring to FIGS. 5-7 and 9-11, the different types of tip sections 22, 22', 22", 22'", 22"" that may be used with the illustrative drain cleaning device 10 will be described. Initially, as shown in FIG. 5, the first type of tip section 22 may comprise an outer covering formed from a hook material strip 30 that is bonded to a core portion of the tip section 22 that extends from the elongated rod section 20. With the first type of tip section 22, the hook material strip 30 comprises the plurality of hook elements 32 of the tip section 22. As shown in FIG. 5, the rolled hook material strip 30 may be slipped over the core portion of the tip section 22, and bonded to the core portion of the tip section 22 using a suitable adhesive or glue (e.g., a two-part epoxy). Turning to FIGS. 6 and 7, in the second and third types of tip sections 22', 22", the plurality of hook elements 34, 36 are integrally formed in the tip section 22', 22" of the drain cleaning device 10. As shown in FIGS. 6 and 7, the plurality of hook elements 34, 36 are in the form of inverted J-shaped projections protruding outwardly from the tip section 22', 22" of the drain cleaning device 10. Also, it can be seen in FIGS. 6 and 7 that the plurality of hook elements 34, 36 are disposed on opposite first and second sides of the core portion of the tip section 22', 22" of the drain cleaning device 10. In the embodiment of FIG. 6, only a single row of hook elements 34 is provided on each side of the core portion of the tip section 22', whereas, in the embodiment of FIG. 7, two rows of hook elements 36 are provided on each side of the core portion of the tip section 22". Also, in the FIG. 7 embodiment, the plurality of hook elements 36 that are disposed on the first side and the second side of the core portion of the tip section 22" are arranged in a staggered pattern. In addition, in the FIG. 7 embodiment, the plurality of hook elements 36 that are disposed on the first side and the second side of the core portion of the tip section 22" comprise two rows of hook elements with free ends that point in generally opposite directions. Finally, referring to FIG. 9, in the fourth type of tip section 22'", the core portion of the tip section 22'" further comprises a mushroom-shaped cap 33 disposed on a distal end thereof. The mushroom-shaped cap 33 is configured to prevent the hook material strip 30 from being pulled off the core portion of the tip section 22'" when the drain cleaning device 10 is being removed from the drain pipe 48 by the user. Like the first type of tip section 22 depicted in FIG. 5, the fourth type of tip section 22'" in FIG. 9 comprises an outer covering formed from a hook material strip 30 (e.g., made from the hook portion of Velcro®) that is bonded to a core portion of the tip section 22'".

Figure 10:
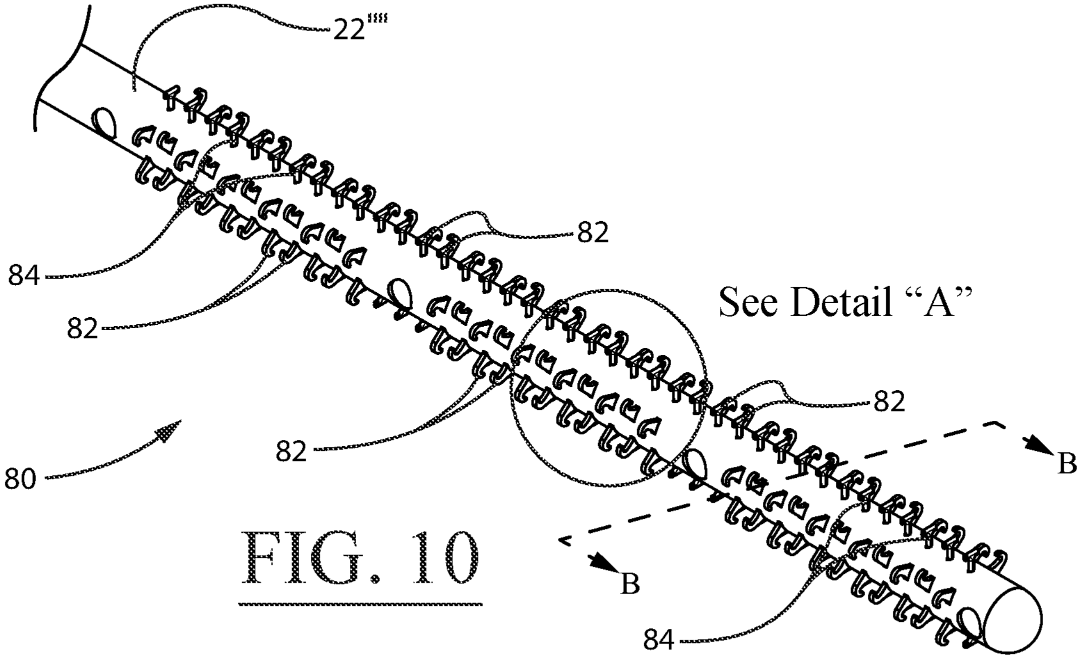
FIG. 10 is a perspective view illustrating a fourth alternative type of tip section that may be incorporated in the drain cleaning device.
Figure 11:
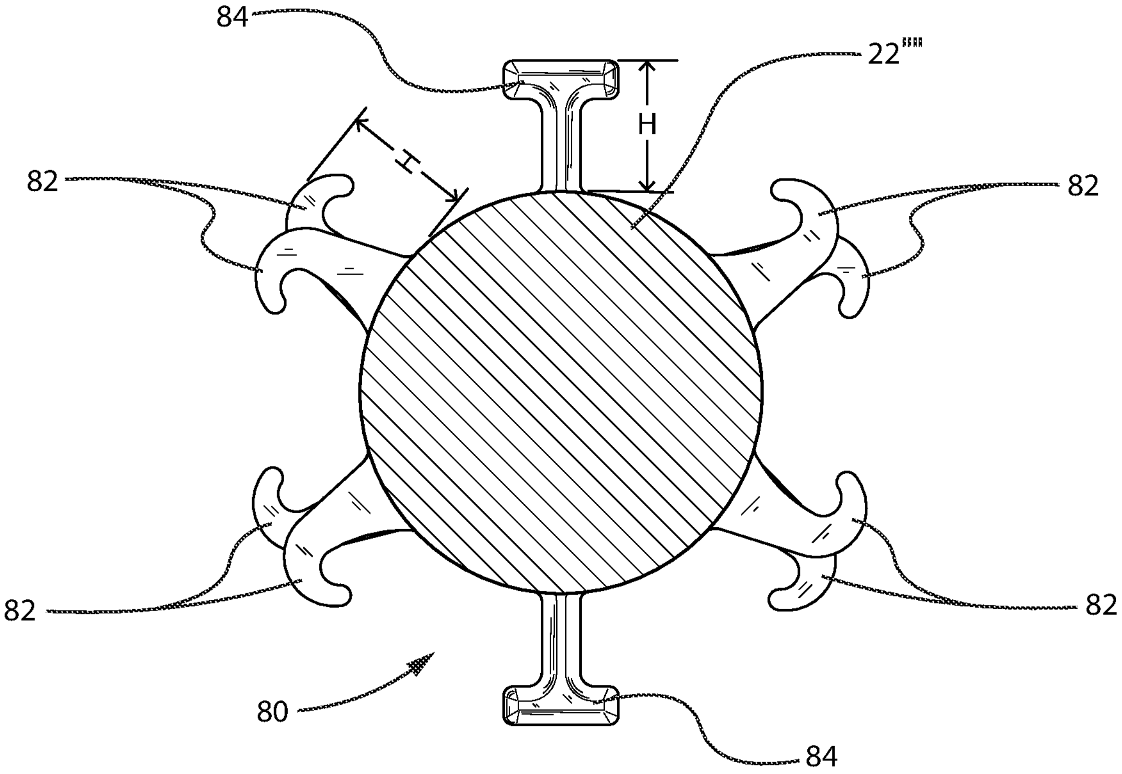
FIG. 11 is a transverse sectional view cut through the fourth alternative type of tip section of FIG. 10, wherein the section is generally cut along the cutting-plane line B-B in FIG. 10.

A fifth type of tip section 22"" that may be used with the illustrative drain cleaning device 10, 80 will be described with reference to FIGS. 10 and 11. As shown in these figures, similar to the second and third types of tip sections 22', 22" described above, the plurality of hook elements 82, 84 are integrally formed in the fifth type of tip section 22"" of the drain cleaning device 80. More specifically, in the fifth type of tip section 22"", the plurality of hook elements 82, 84 are in the form of injection-molded micro-hook elements configured to grab and collect debris from a drain pipe (e.g., from the drain pipe 48 depicted in FIG. 8). The other components of the drain cleaning device 10, 80 that includes the tip section 22"" are the same as that described above with regard to FIG. 1, and thus, a discussion of these components will not be repeated here. As shown in FIGS. 10 and 11, the plurality of injection-molded micro-hook elements 82, 84 are in the form of inverted J-shaped projections 82 and T-shaped projections 84 protruding outwardly from the tip section 22"" of the drain cleaning device 80. Also, it can be seen in FIGS. 10 and 11 that the plurality of injection-molded micro-hook elements 82, 84 are disposed on opposite first and second sides of the core portion of the tip section 22"" of the drain cleaning device 80. In the embodiment of FIGS. 10 and 11, two rows of injection-molded micro-hook inverted J-shaped elements 82 are provided on each side of the core portion of the tip section 22"", while one row of injection-molded micro-hook T-shaped elements 84 is provided on each of the top and bottom of the core portion of the tip section 22"". Also, as shown in FIGS. 10 and 11, the injection-molded micro-hook inverted J-shaped elements 82 that are disposed on the first side and the second side of the core portion of the tip section 22"" are arranged in rows where every other injection-molded micro-hook element 82 points in an opposite direction (i.e., the injection-molded micro-hook elements 82 point in alternating directions along the length of tip section 22""). In addition, in the embodiment of FIGS. 10 and 11, the injection-molded micro-hook inverted J-shaped elements 82 that are disposed on the first side and the second side of the core portion of the tip section 22"" comprise two rows of micro-hook elements with free ends that point in generally opposite directions (see the sectional view of FIG. 11).

In the illustrative embodiment of FIGS. 10 and 11, the tip section 22"" comprises a tip body portion with a circular cross-section. As shown in FIGS. 10 and 11, the plurality of injection-molded micro-hook elements 82, 84 are arranged in circumferentially spaced-apart rows on the tip body portion (see FIG. 11). In the illustrative embodiment, each of the circumferentially spaced-apart rows comprises a subset of the injection-molded micro-hook elements 82, 84 arranged in generally linear pattern (see FIGS. 10 and 11) on the narrow, circular shaft of the tip body portion. In the illustrative embodiment, the circular shaft of the tip body portion in FIGS. 10 and 11 may have a diameter in the range between approximately 3.25 millimeters and approximately 4.25 millimeters, inclusive (or a diameter between 3.25 millimeters and 4.25 millimeters, inclusive). For example, in the illustrative embodiment, the circular shaft of the tip body portion may have a diameter of approximately 4.05 millimeters. In another embodiment, the injection-molded micro-hook elements 82, 84 may be provided on a flat strip of material that forms a part of a drain cleaning device, rather than the circular shaft of the tip body portion depicted in FIGS. 10 and 11.

In the illustrative embodiment, as shown in FIGS. 10 and 11, the tip section 22"" comprises a total of six (6) circumferentially spaced-apart rows of the injection-molded micro-hook elements 82, 84 (i.e., four (4) rows of the injection-molded micro-hook inverted J-shaped elements 82, and two (2) rows of the injection-molded micro-hook T-shaped elements 84). In the illustrative embodiment, there may be approximately forty (40) injection-molded micro-hook elements 82, 84 in each row, wherein each row may have a length of approximately 2.75 inches. As such, in the illustrative embodiment, a total of approximately two-hundred and forty (240) injection-molded micro-hook elements 82, 84 may located in a small 2.75-inch section of the drain cleaning device 80.

In the illustrative embodiment, the injection-molded micro-hook elements 82, 84 may have a thickness T (see FIG. 12) between approximately 0.25 millimeters and approximately 0.50 millimeters, inclusive (or a thickness between 0.25 millimeters and 0.50 millimeters, inclusive). For example, in the illustrative embodiment, the injection-molded micro-hook elements 82, 84 may have a thickness of approximately 0.27 millimeters. Also, in the illustrative embodiment, the injection-molded micro-hook elements 82, 84 may have a height H (see FIG. 11) between approximately 1.5 millimeters and approximately 2.0 millimeters, inclusive (or a height between 1.5 millimeters and 2.0 millimeters, inclusive). For example, in the illustrative embodiment, the injection-molded micro-hook elements 82, 84 may have a height of approximately 1.73 millimeters.

Figure 3:
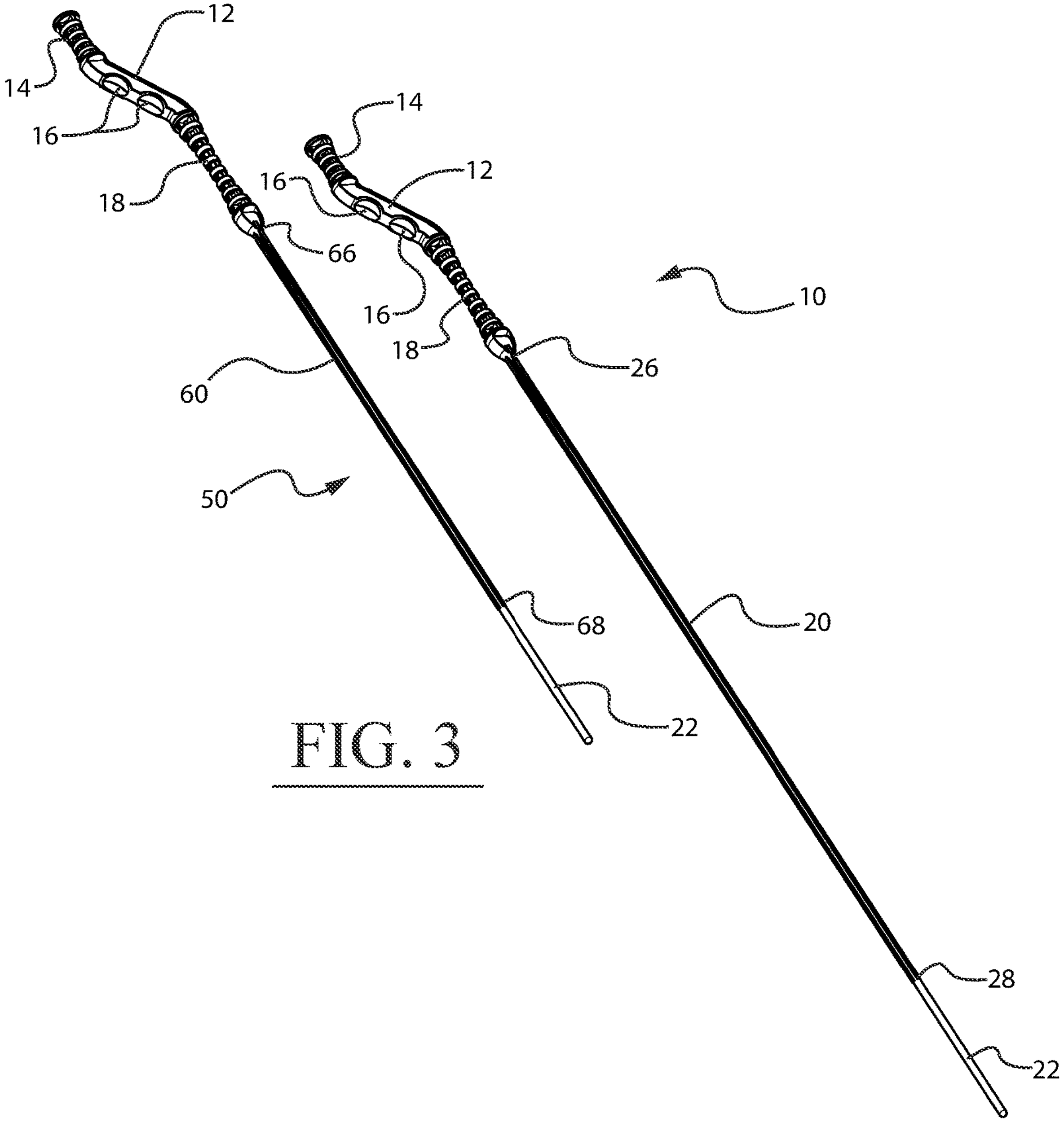
FIG. 3 is a perspective view of the drain cleaning device of FIG. 1 depicted next to a second embodiment of the drain cleaning device.

In the illustrative embodiment, the injection mold for the device 10, 80 may be designed with interchangeable inserts. The inserts are installed into the mold and allow the device 10, 80 to be mass-produced in different styles without having to make new mold for each style of device 10, 80. For example, one mold insert will produce a round end on the device 10 (so that the hook material strip 30 may be bonded to the tip section). A different insert could be installed in the mold for molding plastic barbs or hooks on the end (e.g., as shown in FIGS. 6 and 7). Also, the inserts can be different lengths so that a 12" long shaft (see device 50 on the left side in FIG. 3) or an 18" long shaft (see device 10 on the right side in FIG. 3) can be produced using the same mold. In FIG. 3, the drain cleaning device 50 is generally the same as the drain cleaning device 10, except that the length of the elongated rod section 60 between ends 66, 68 is shorter than the length of the elongated rod section 20 between ends 26, 28.

Figure 8:
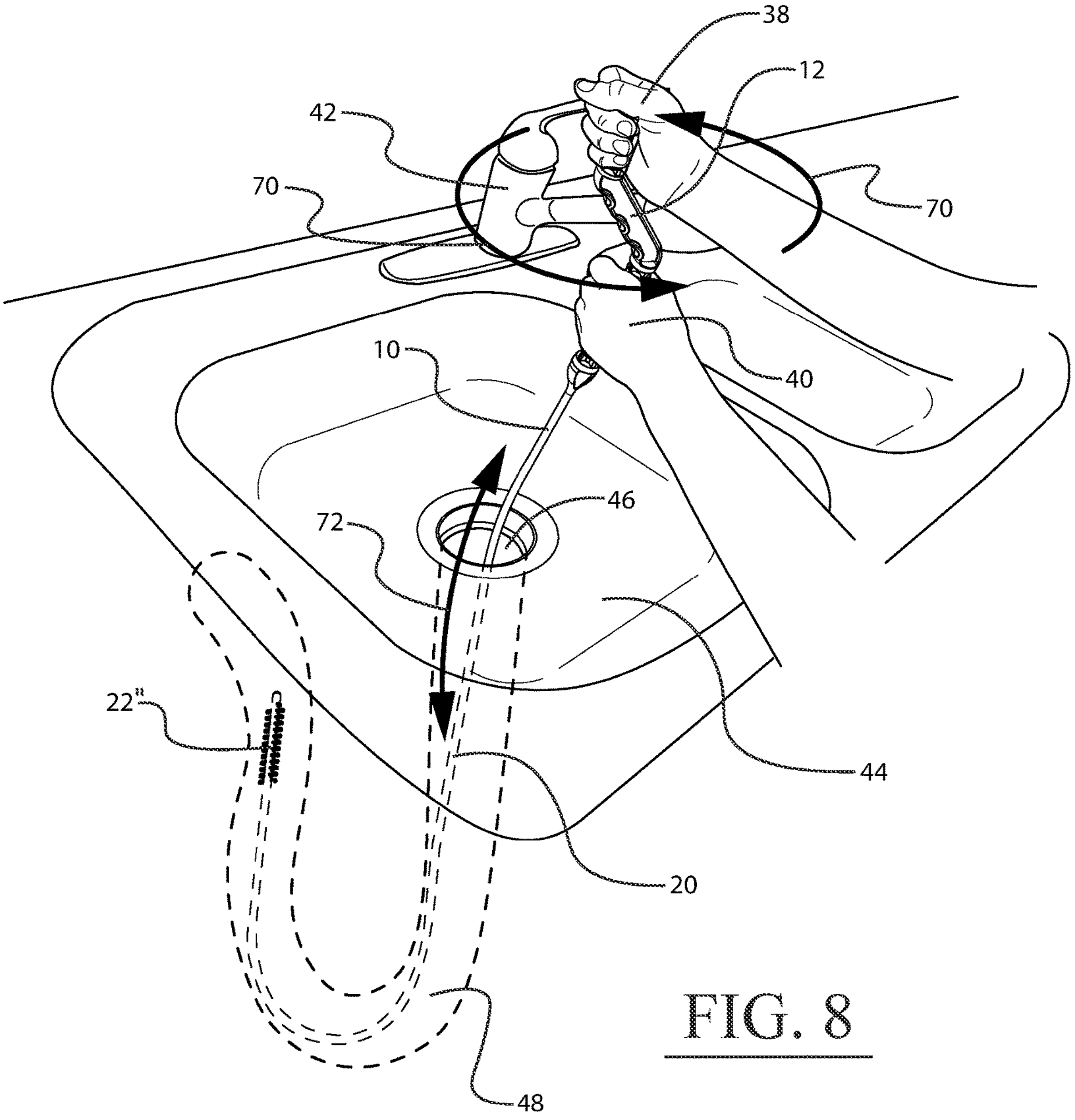
FIG. 8 is a perspective view illustrating the manner in which the drain cleaning device of FIG. 1 may be used to clean a drain pipe of a sink drain.
Figure 9:
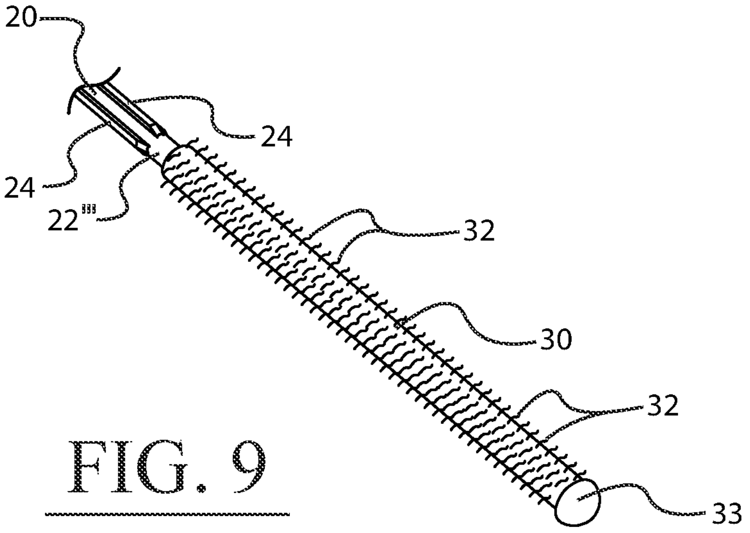
FIG. 9 is a perspective view illustrating a third alternative type of tip section that may be incorporated in the drain cleaning device.

In FIG. 8, the operation of the drain cleaning device 10 is illustrated. More specifically, FIG. 8 shows the inventive drain cleaning device 10 being used in a kitchen sink 44 to remove clogging debris from the drain pipe 48 of the sink 44. The kitchen sink 44 has an associated kitchen faucet 42 for dispensing water into the sink 44. In the illustrative embodiment, the diameter of the elongated rod section 20 of the device 10 is sufficiently narrow to be easily inserted through openings in a typical drain cover all the way to the drain trap, often found in older residential bathrooms or modern drains having pop-up stoppers. Referring again to FIG. 8, after insertion of the elongated rod section 20 into the drain 46 (as diagrammatically indicated by downwardly directed arrow 72), the handle section 12 is rotated (as diagrammatically indicated by curved arrows 70), thus winding into and capturing the clogging debris. The particular construction of the hook surface of the hook material strip 30, and of the tip section 22, allows the debris to be collected and grabbed by the drain cleaning device 10. After grabbing the clogging debris, the device 10 is removed from the drain 46 (as diagrammatically indicated by upwardly directed arrow 72).

In one or more embodiments, the entire drain cleaning device 10, 80 is configured to be discarded after being used to remove the debris from the drain pipe 48. In other words, the drain cleaning device 10, 80 is disposable, and is designed for single cleaning of a drain. The used drain cleaning device 10, 80 with the collected debris can be safely and environmentally discarded. Then, a new drain cleaning device 10, 80 can be used to remove hair from another clogged drain.

Another illustrative embodiment of the drain cleaning device is seen generally at 10' in FIGS. 13-18. Referring to these figures, it can be seen that, in many respects, the illustrative embodiment of FIGS. 13-18 is similar to that of the illustrative embodiment of FIGS. 1-2. Moreover, many elements are common to both such embodiments. For the sake of brevity, the elements that the illustrative embodiment of FIGS. 13-18 has in common with the embodiment of FIGS. 1-2 will not be discussed in detail because these components have already been described above.

Like drain cleaning device 10 described above, the drain cleaning device 10' of the illustrative embodiment of FIGS. 13-18 generally comprises a handle section 12', the handle section 12' including at least one hourglass-shaped portion 14', 18' for facilitating the spinning of the drain cleaning device 10' by a user; an elongated rod section 20' connected to the handle section 12'; and a tip section 22"" connected to the elongated rod section 20', the tip section 22"" including a plurality of hook elements 82, 84 disposed thereon (see FIG. 10), the plurality of hook elements 82, 84 configured to grab and collect debris from a drain pipe. Similar to the drain cleaning device 10 described above, the drain cleaning device 10' is used for removing debris from a drain (e.g., from the drain pipe 48 of the drain 46 depicted in FIG. 8).

Figure 13:
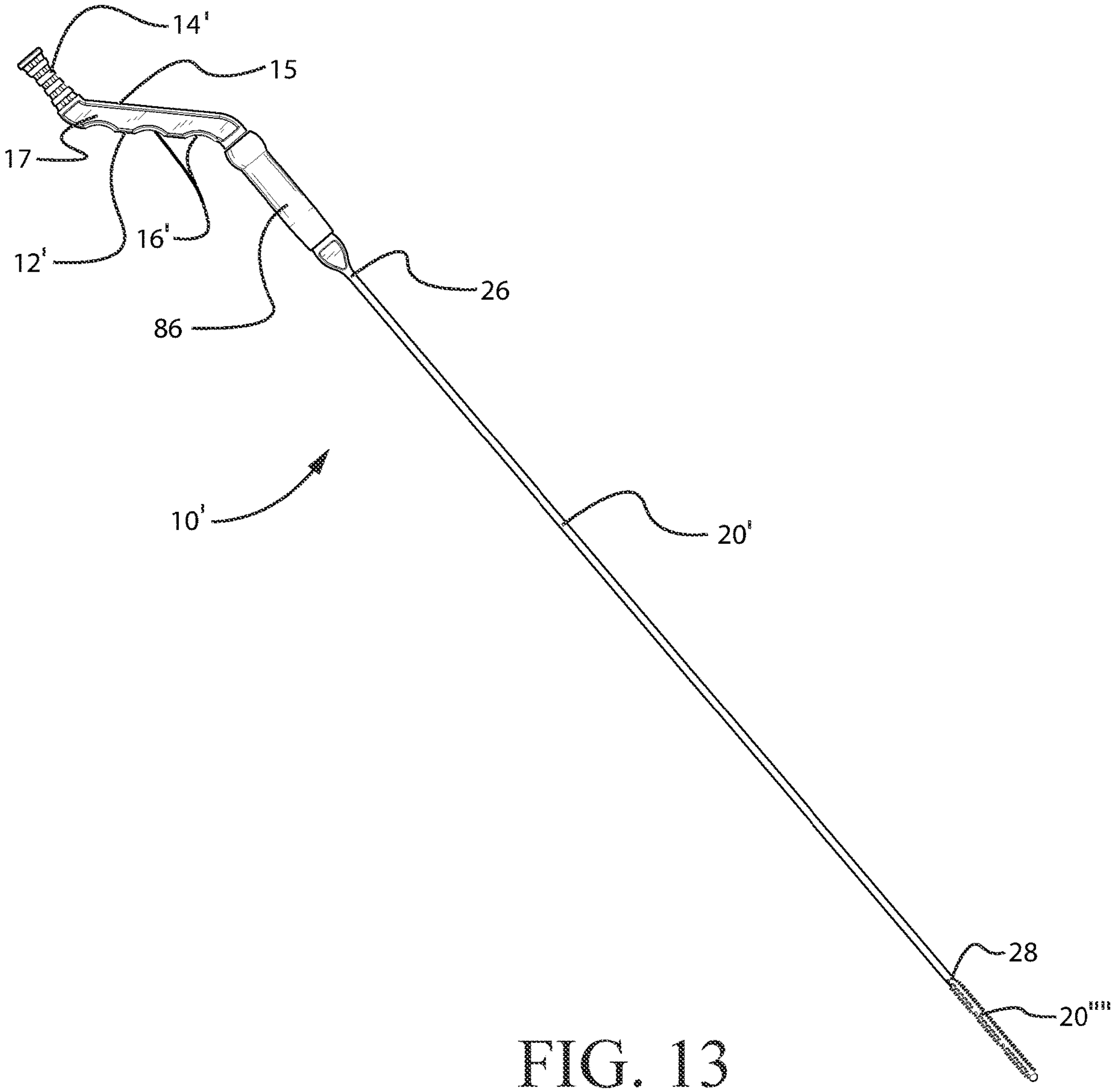
FIG. 13 is a perspective view of a drain cleaning device, according to a third embodiment of the invention.
Figure 14:
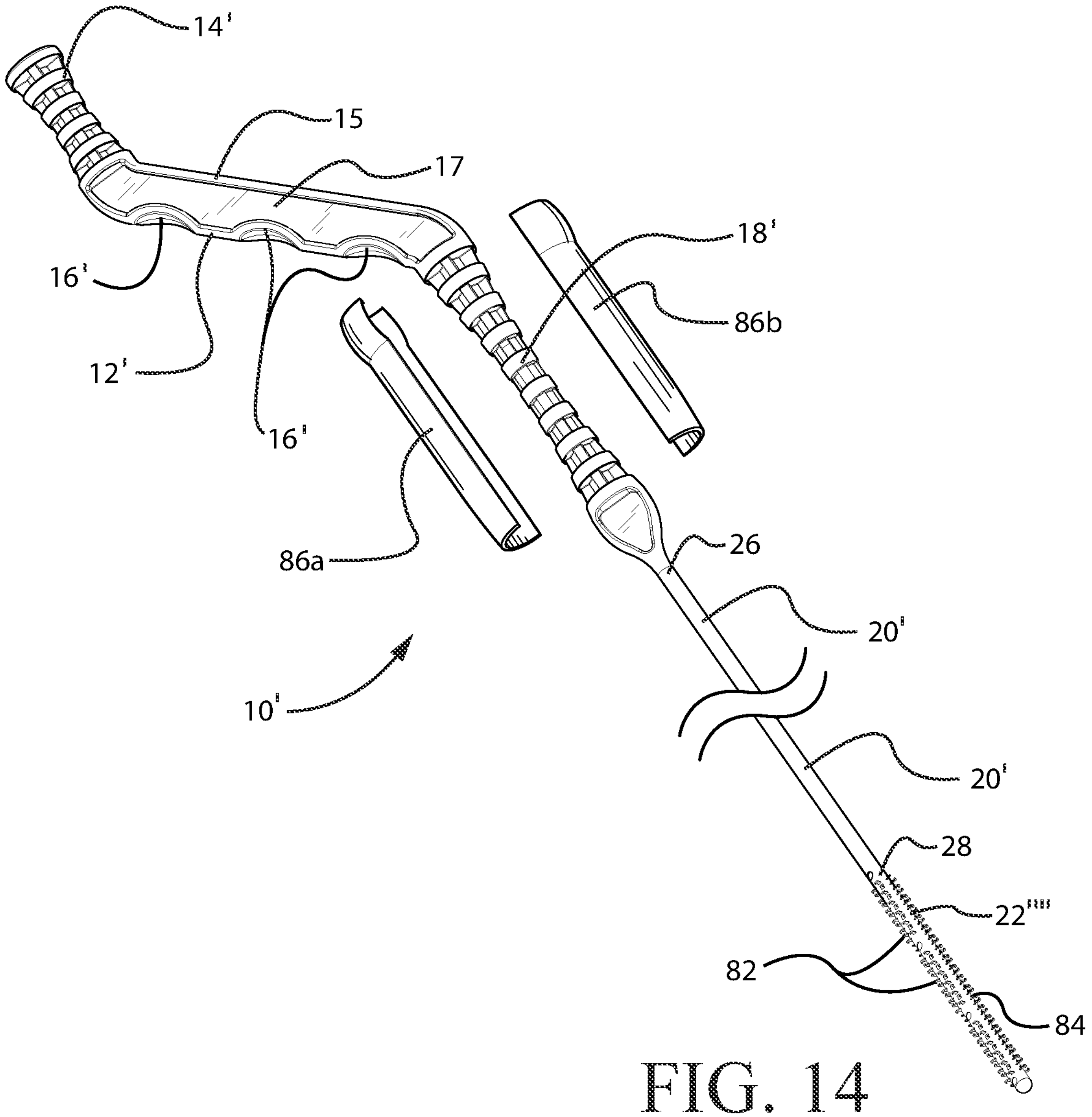
FIG. 14 is a partial enlarged perspective view of the drain cleaning device of FIG. 13, wherein the sleeve member is shown exploded from the remainder of the handle section.
Figure 15:
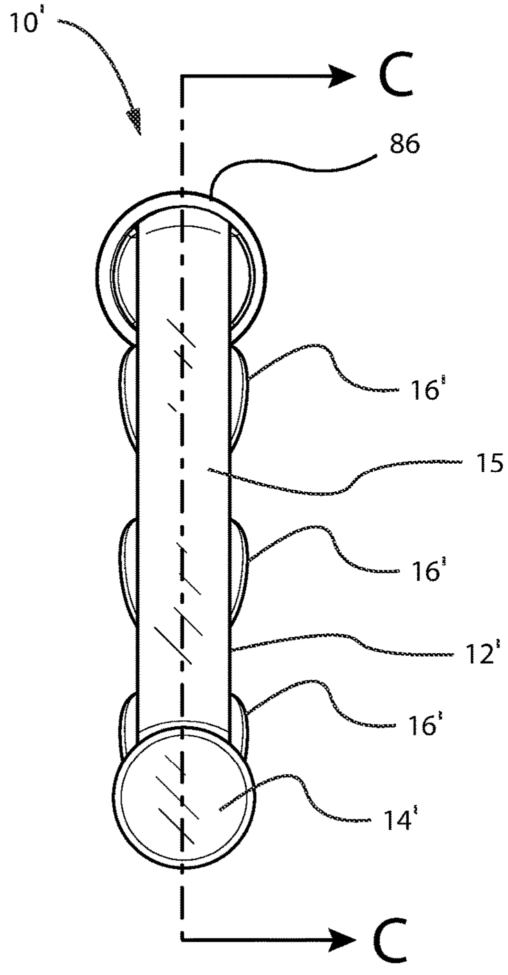
FIG. 15 is a top plan view of the drain cleaning device of FIG. 13.

In the illustrative embodiment of FIGS. 13-18, with combined reference to FIGS. 13 and 14, it can be seen that the at least one hourglass-shaped portion 14', 18' of the handle section 12' comprises an upper hourglass-shaped portion 14' and a lower hourglass-shaped portion 18'. Also, in this illustrative embodiment, a sleeve member 86 is rotatably disposed on the lower hourglass-shaped portion 18' (see FIGS. 13 and 16). In the illustrative embodiment, as shown in FIG. 14, the sleeve member 86 is formed from two half sections **86*a*, 86*b*, and the sleeve member 86 may be attached to the lower hourglass-shaped portion 18' of the handle section 12' by gluing or ultrasonically welding the two half sections 86*a*, 86*b* of the sleeve member 86 together. Further, in the illustrative embodiment, the upper hourglass-shaped portion 14' is configured to accommodate a first hand 38 of a user during the spinning of the drain cleaning device 10' by the user (see FIG. 18). The sleeve member 86 on the lower hourglass-shaped portion 18' is configured to accommodate a second hand 40 of the user during the spinning of the drain cleaning device 10' by the user. As best shown in the sectional view of FIG. 17, the upper and lower ends of the sleeve member 86 are respectively received with the upper and lower grooves 90, 96. The sleeve member 86 is able to rotate within the grooves 90, 96, but is axially constrained by the bounding edges of the grooves 90, 96 so that the sleeve member 86 is unable to slide up or down the device 10' after it is attached in place on the lower hourglass-shaped portion 18'. For example, the upper rib 92 of the lower hourglass-shaped portion 18' prevents the sleeve member 86 from sliding downwardly, while the lower rib 94 of the lower hourglass-shaped portion 18' prevents the sleeve member 86** from sliding upwardly.

Figure 16:
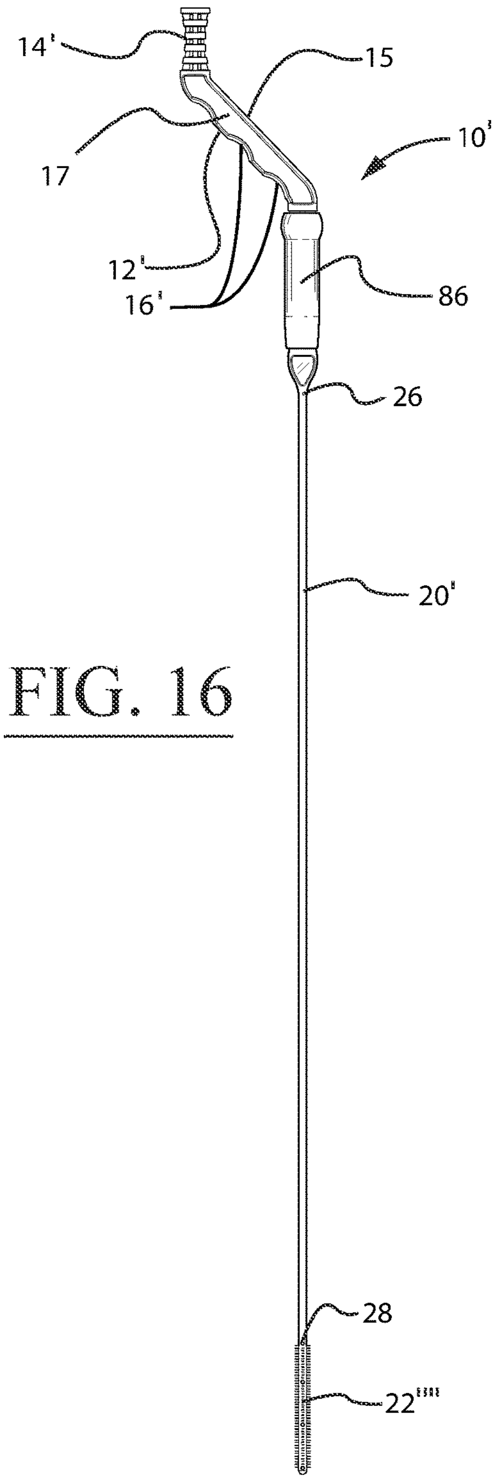
FIG. 16 is a front elevational view of the drain cleaning device of FIG. 13.
Figure 17:
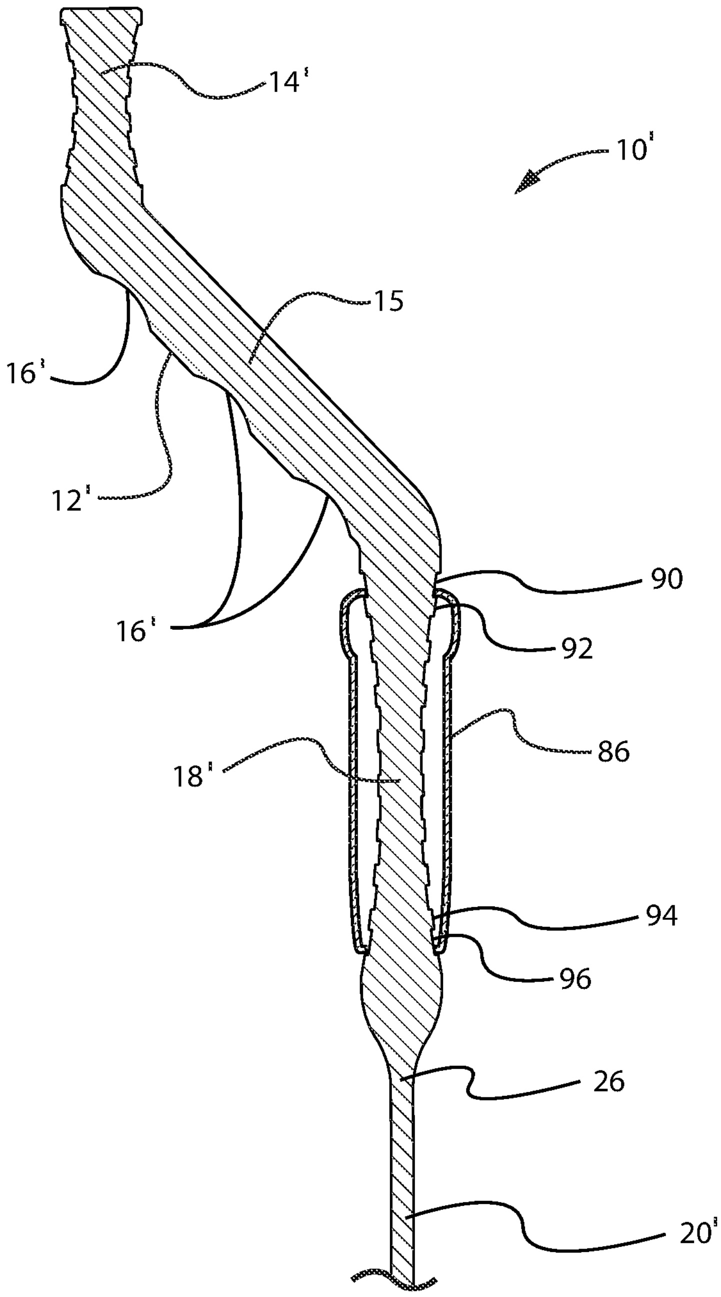
FIG. 17 is an enlarged longitudinal sectional view cut through the handle section of the drain cleaning device of FIG. 13, wherein the section is generally cut along the cutting-plane line C-C in FIG. 15.

As shown in FIGS. 13, 14, and 16, in the illustrative embodiment, the handle section 12' further comprises a diagonal handle portion 15 connecting the upper hourglass-shaped portion 14' to the lower hourglass-shaped portion 18'. As shown in the illustrative embodiment of FIGS. 13, 14, and 16, the diagonal handle portion 15 comprises a plurality of finger concave recesses or indentations 16' for accommodating fingers of the user when the drain cleaning device 10' is being inserted into, and removed from the drain pipe 48 (see FIG. 8). Also, as shown in FIGS. 13, 14, and 16, the diagonal handle portion 15 has a recess 17 formed therein that extends between the upper hourglass-shaped portion 14' and the lower hourglass-shaped portion 18'. In the illustrative embodiment, it can be seen that the recess 17 of the diagonal handle portion 15 has a flat bottom wall (see FIGS. 13, 14, and 16). Advantageously, the recess 17 with the flat bottom wall facilitates the grasping of the drain cleaning device 10' as it is pulled out of a drain by a user.

Figure 18:
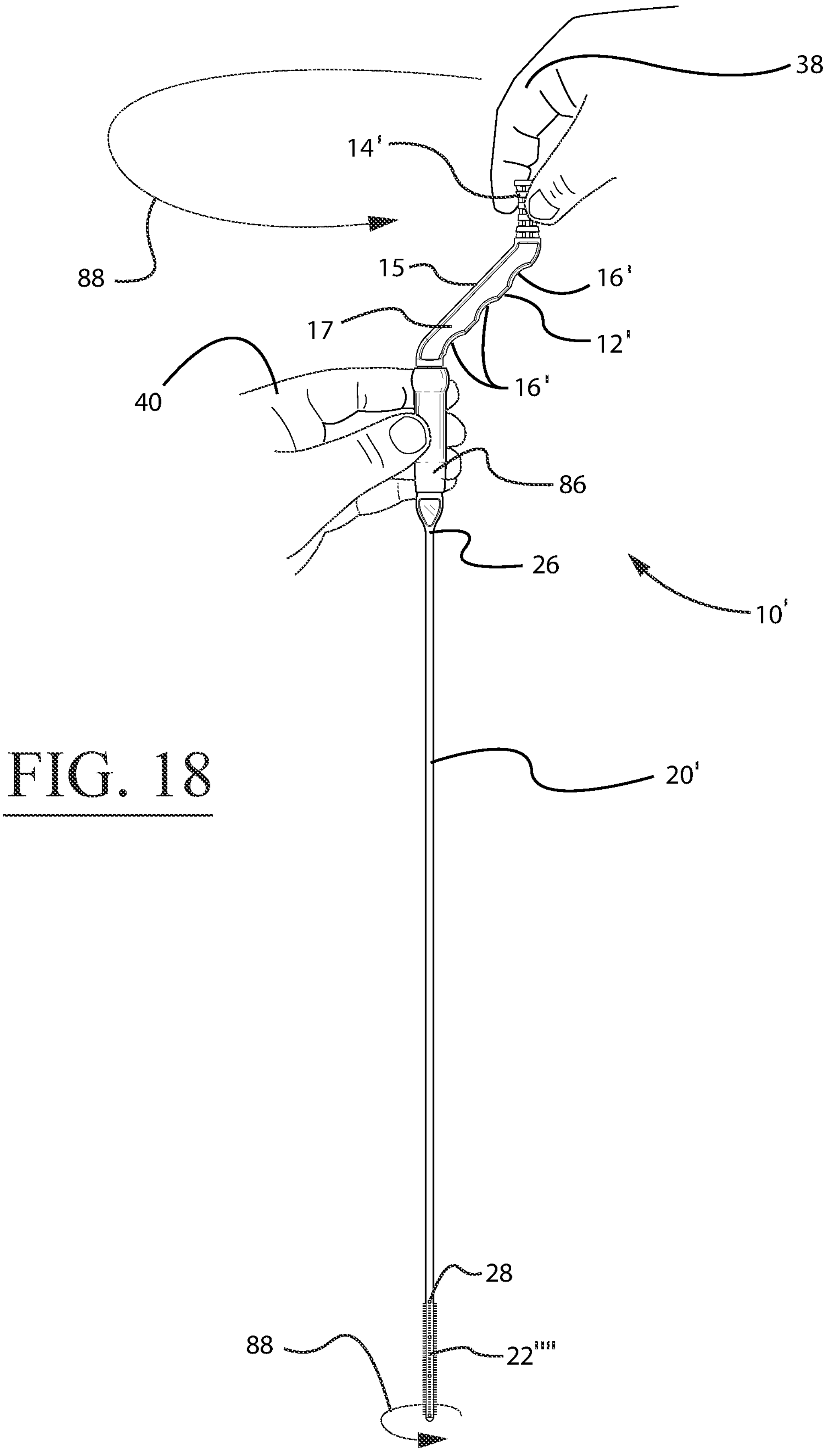
FIG. 18 is another front elevational view of the drain cleaning device of FIG. 13 illustrating the manner in which the drain cleaning device is able to be rotated by a user.

Advantageously, as illustrated in FIG. 18, the upper hourglass-shaped portion 14' and the sleeve member 86 on the handle section 12' allow a user to spin the drain cleaning device 10' comfortably (the rotation of the device 10' is diagrammatically indicated by the curved arrow 88 in FIG. 18). In the illustrative embodiment, one hand 38 is placed on the upper hourglass-shaped portion 14', and the other hand 40 on the sleeve member 86 (for holding the sleeve member 86 stationary relative to portion 18' that is rotating) so as to spin the device 10' in a 360-degree manner without the need to release the handle when unclogging a drain. Spinning action is important to dislodging hair clogs that accumulate in the drain (and get wrapped around drain parts, like the stopper). The finger recesses 16' are used for pushing and pulling the device 10' up and down within the drain. The up and down movement is used for pushing the device 10' further into the drain, or pulling the clog up and out of the drain.

Figure 12:
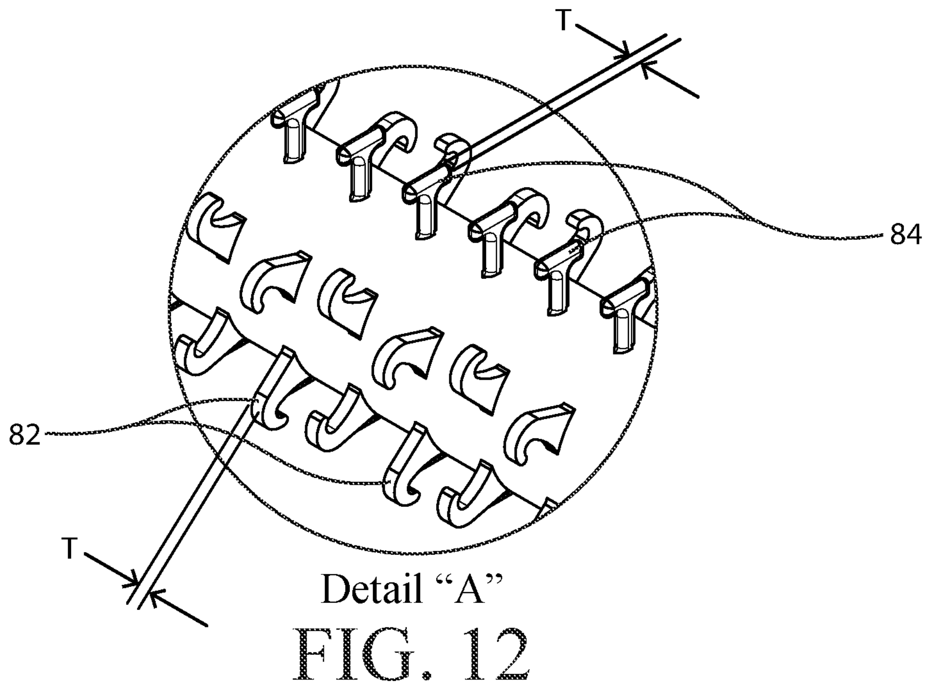
FIG. 12 is an enlarged view of a portion of the tip section in FIG. 10, wherein the hook elements of the tip section are illustrated in more detail (Detail "A")

In the illustrative embodiment of FIGS. 13-18, with particular reference to FIGS. 13, 14, and 16, the tip section 22"" of the drain cleaning device 10' comprises the combination of injection-molded micro-hook inverted J-shaped elements 82 and injection-molded micro-hook T-shaped elements 84 that were described above in detail with reference to the device 80 of FIGS. 10-12. As shown in FIGS. 10-12, the micro-hook inverted J-shaped elements 82 and micro-hook T-shaped elements 84 extend radially outward from the tip section 22"", and thus point towards the pipe wall of the drain pipe when the device 10' is being used to unclog a drain. Advantageously, the radially disposed micro-hook elements 82, 84 do not get caught on the drain pipe when inserting and removing the device 10' from the drain. The radially disposed elements 82, 84 also do not get caught on the drain assembly when rotating the drain cleaning device 10' during the unclogging of the drain, thereby preventing the undesirable back-spinning of the device 10'. Also, advantageously, the radially disposed micro-hook elements 82, 84 engage accumulated hair in the drain pipe as the device 10' spins (i.e., the micro-hook elements 82, 84 lock onto the hair as the device 10' spins). That is, the fine micro-hook elements 82, 84 grab the fine hair that is disposed inside the drain pipe.

It is readily apparent that the aforedescribed drain cleaning device 10, 10', 50, 80 offers numerous advantages. For example, the drain cleaning device 10, 10', 50, 80 effectively cleans a bathroom drain or other type of drain by unblocking the drain of accumulated hair and other debris. The drain cleaning device 10, 10', 50, 80 is designed to be used as a do-it-yourself (DYI) upper drain cleaning device.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A drain cleaning device for removing debris from a drain, the drain cleaning device comprising:

a handle section, the handle section including an upper handle portion and a lower handle portion, the upper handle portion being spaced apart from the lower handle portion along a length of the drain cleaning device, the upper handle portion configured to accommodate a first hand of a user during a spinning of the drain cleaning device by the user, the lower handle portion configured to accommodate a second hand of the user during the spinning of the drain cleaning device by the user, and the lower handle portion comprising a lower hourglass-shaped portion for facilitating the spinning of the drain cleaning device by the user, the lower hourglass-shaped portion being inwardly tapered from both ends such that a smallest cross-sectional area of the lower handle portion is centrally located on the lower handle portion;

an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements extending from the central core portion, at least some of the plurality of protruding elements being in a form of a plurality of hook elements with free ends that point in generally opposite directions, and the plurality of protruding elements are configured to grab and collect debris from the drain pipe.

2. The drain cleaning device according to claim 1, wherein the handle section further comprises a diagonal handle portion connecting the upper handle portion to the lower handle portion, the diagonal handle portion having a recess formed therein that extends between the upper handle portion and the lower handle portion, and the recess of the diagonal handle portion having a flat bottom wall.

3. The drain cleaning device according to claim 2, wherein at least one section of the upper handle portion has a generally circular cross-section.

4. The drain cleaning device according to claim 2, wherein the lower handle portion further comprises a sleeve member rotatably disposed about the lower hourglass-shaped portion of the lower handle portion, the sleeve member configured to be grasped by the second hand of the user during the spinning of the drain cleaning device by the user such that a remainder of the drain cleaning device is able to be rotated relative to the sleeve member while the sleeve member is held stationary by the second hand of the user.

5. The drain cleaning device according to claim 1, wherein the elongated rod section does not contain any ribs or protruding elements between the first and second ends of the elongated rod section.

6. The drain cleaning device according to claim 5, wherein at least a portion of the elongated rod section has a generally circular cross-section.

7. The drain cleaning device according to claim 1, wherein the upper handle portion comprises an upper hourglass-shaped portion for facilitating the spinning of the drain cleaning device by the user.

8. The drain cleaning device according to claim 7, wherein the upper hourglass-shaped portion is configured to accommodate the first hand of the user during the spinning of the drain cleaning device by the user, and the lower hourglass-shaped portion is configured to accommodate the second hand of the user during the spinning of the drain cleaning device by the user.

9. The drain cleaning device according to claim 8, wherein the handle section further comprises a diagonal handle portion connecting the upper hourglass-shaped portion to the lower hourglass-shaped portion, the diagonal handle portion comprising one or more finger recesses for accommodating one or more fingers of the user when the drain cleaning device is being inserted into, and removed from the drain pipe.

10. The drain cleaning device according to claim 1, wherein the tip section further comprises an outer covering formed from a hook material strip that is bonded to the central core portion of the tip section that extends from the elongated rod section, the hook material strip comprising the plurality of protruding elements of the tip section.

11. The drain cleaning device according to claim 10, wherein the central core portion of the tip section further comprises a mushroom-shaped cap disposed on a distal end thereof, the mushroom-shaped cap configured to prevent the hook material strip from being pulled off the central core portion of the tip section when the drain cleaning device is being removed from the drain pipe by the user.

12. The drain cleaning device according to claim 1, wherein the plurality of protruding elements are in a form of a plurality of injection-molded micro-hook elements and at least some of the plurality of injection-molded micro-hook elements comprise the plurality of hook elements with the free ends that point in generally opposite directions.

13. The drain cleaning device according to claim 12, wherein the plurality of hook elements are in a form of inverted J-shaped projections protruding outwardly from the central core portion of the tip section of the drain cleaning device.

14. The drain cleaning device according to claim 12, wherein other ones of the plurality of injection molded micro-hook elements are in a form of T-shaped projections protruding outwardly from the central core portion of the tip section of the drain cleaning device.

15. A drain cleaning device for removing debris from a drain, the drain cleaning device comprising:

a handle section;

an elongated rod section having a first end and a second end oppositely disposed relative to the first end, the first end of the elongated rod section being connected to the handle section, the elongated rod section not containing any ribs or protruding elements between the first and second ends of the elongated rod section; and a tip section connected to the second end of the elongated rod section, the tip section including a central core portion and a plurality of protruding elements integrally formed with the central core portion, the central core portion having a longitudinal axis, the plurality of protruding elements being in a form of a plurality of micro-hook elements that are molded as one piece with the central core portion such that the plurality of micro-hook elements extend from an outer circular wall surface of the central core portion in a direction that is generally perpendicular to the longitudinal axis of the central core portion, at least some of the plurality of micro-hook elements having free ends that point in generally opposite directions, and the plurality of protruding elements are configured to grab and collect debris from the drain pipe.

16. The drain cleaning device according to claim 15, wherein at least one of the plurality of micro-hook elements has a thickness between approximately 0.25 millimeters and approximately 0.50 millimeters; and wherein the at least one of the plurality of micro-hook elements has a height between approximately 1.5 millimeters and approximately 2.0 millimeters.

17. The drain cleaning device according to claim 15, wherein the central core portion of the tip section has a circular cross-section, the plurality of micro-hook elements are arranged in circumferentially spaced-apart rows on the circular central core portion, and each of the circumferentially spaced-apart rows comprises a subset of the injection-molded micro-hook elements arranged in a generally linear pattern.

18. The drain cleaning device according to claim 15, wherein the plurality of micro-hook elements having the free ends that point in generally opposite directions are in a form of inverted J-shaped projections protruding outwardly from the central core portion of the tip section of the drain cleaning device; and wherein other ones of the plurality of micro-hook elements are in a form of T-shaped projections protruding outwardly from the central core portion of the tip section of the drain cleaning device.

19. A drain cleaning device for removing debris from a drain, the drain cleaning device comprising:

a handle section, the handle section including an upper handle portion, a lower handle portion, and a diagonal handle portion, the upper handle portion being spaced apart from the lower handle portion along a length of the drain cleaning device, the diagonal handle portion connecting the upper handle portion to the lower handle portion, the upper handle portion configured to accommodate a first hand of a user during a spinning of the drain cleaning device by the user, and the lower handle portion configured to accommodate a second hand of the user during the spinning of the drain cleaning device by the user, the lower handle portion comprising an hourglass-shaped portion for facilitating the spinning of the drain cleaning device by the user, the hourglass-shaped portion being inwardly tapered from both ends such that a smallest cross-sectional area of the lower handle portion is centrally located on the lower handle portion, and the lower handle portion further comprising a sleeve member rotatably disposed about the hourglass-shaped portion of the lower handle portion, the sleeve member configured to be grasped by the second hand of the user during the spinning of the drain cleaning device by the user such that a remainder of the drain cleaning device is able to be rotated relative to the sleeve member while the sleeve member is held stationary by the second hand of the user;

an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements integrally formed with the central core portion, at least some of the plurality of protruding elements being in a form of a plurality of hook elements with free ends that point in generally opposite transverse directions, and the plurality of protruding elements are configured to grab and collect debris from the drain pipe.

* * * * *